United States Patent [19]

Nakagawa et al.

[11] Patent Number: 5,268,398

[45] Date of Patent: Dec. 7, 1993

[54] FRICTION MATERIAL AND METHOD OF MANUFACTURING SUCH MATERIAL

[75] Inventors: Mitsuhiko Nakagawa; Yukinori Yamashita; Masanori Ibuki; Hiroya Kishimoto, all of Itami, Japan

[73] Assignee: Sumitomo Electric Industries, Ltd., Osaka, Japan

[21] Appl. No.: 930,500

[22] Filed: Aug. 17, 1992

Related U.S. Application Data

[63] Continuation of Ser. No. 696,623, May 7, 1991, abandoned, which is a continuation-in-part of Ser. No. 576,671, Aug. 31, 1990, abandoned.

[30] Foreign Application Priority Data

Sep. 1, 1989 [JP] Japan .................................. 1-228153
Aug. 29, 1990 [JP] Japan .................................. 2-229091

[51] Int. Cl.$^5$ ............................ C08J 5/14; C08K 3/20; C08K 3/04
[52] U.S. Cl. .................................. 523/158; 523/153; 523/155; 523/156; 523/157; 524/447; 524/449; 524/451; 524/495
[58] Field of Search ............... 524/447, 449, 451, 495; 523/153, 155, 156, 157, 158

[56] References Cited

U.S. PATENT DOCUMENTS

| | | | |
|---|---|---|---|
| 4,388,423 | 6/1983 | Kaufman et al. | 523/153 |
| 4,403,047 | 9/1983 | Albertson | 523/153 |
| 4,678,818 | 7/1987 | Nakagawa et al. | 523/149 |
| 4,735,975 | 4/1988 | Iwata et al. | 523/153 |

FOREIGN PATENT DOCUMENTS

| | | |
|---|---|---|
| 2142995 | 3/1973 | Fed. Rep. of Germany . |
| 54-34349 | 3/1979 | Japan . |
| 57-37187 | 8/1982 | Japan . |
| 59-4459 | 1/1984 | Japan . |
| 64-4541 | 1/1989 | Japan . |
| 2011448 | 7/1979 | United Kingdom . |

Primary Examiner—Paul R. Michl
Assistant Examiner—Peter Szekely
Attorney, Agent, or Firm—W. G. Fasse

[57] ABSTRACT

A friction material is so manufactured that a hygienic environment can be maintained while simultaneously reducing the brake noise without reducing the friction coefficient of the brake pads made of the present material. The friction material is granulated or agglomerated by a first binder which binds one or more inorganic substances having a plane netlike crystal structure into granules which are deformed so that the particles have a flat particle orientation in the resulting granules. The flat particle orientation is achieved by the application pressure and/or heat during the formation. The granules are then embedded in a second binder forming a fibrous matrix for forming the brake pad material. The inorganic substance or substances forming the particles having the plane netlike crystal structure, promote a microseparation in the friction surface in response to the application of a brake force. The microseparation effectively prevents brake noise.

14 Claims, 6 Drawing Sheets

(NOTE) THE SECOND EFFECTIVENESS
130 Km/H FRICTION COEFFICIENT OF 0.6g

PLANE NETWORK
CRYSTAL STRUCTURE ered

FRICTION MATERIAL AND METHOD OF MANUFACTURING SUCH MATERIAL

CROSS-REFERENCE TO RELATED APPLICATION

This application is a continuation of application Ser. No. 07/696,623, filed on May 7, 1991, now abandoned, which is a continuation-in-part of copending application Ser. No. 07/575,671, filed in the U.S.A. on Aug. 31, 1990, now abandoned.

FIELD OF THE INVENTION

The present invention relates to friction materials and to a method of manufacturing the friction material. Such friction materials are used in disc brakes, drum brakes and the like of vehicles such as trucks and automobiles.

BACKGROUND INFORMATION

Conventionally, a material which uses asbestos as a main friction material is generally known for use in brakes for trucks, automobiles and the like. However, there is a demand for friction materials not using asbestos from the viewpoint of safety and hygiene Japanese Patent Laying-Open No. 54-34349, Japanese Patent Publication No. 64-4541, Japanese Patent Publication No. 57-37187 and Japanese Patent Publication No. 59-4459 disclose conventionally and generally known friction materials not using asbestos. Japanese Patent Laying-Open No. 54-34349, which corresponds to U.S. Pat. Nos. 4,273,699 (Chester) and 4,310,452 (Chester) discloses a friction material obtained by forming a mixture of phenol-formaldehyde resin and fibers such as steel fibers or glass fibers and an inorganic reinforcement material other than asbestos. Mica is listed as one of the grain reinforcing materials.

Japanese Patent Publication No. 64-4541 discloses the use of mica as a filler in a friction material using glass fibers and fused liquid crystalline polyester as a matrix material of a polymer binder in order to change the properties of the friction material and to reduce manufacturing costs.

Japanese Patent Publication No. 57-37187 discloses a friction material including a fibrous substance of 0-5 vol. %, scaly or layered mica of 20-60 vol. %, phenol resin of 5-30 vol. %, $BaSO_4$ of 5-30 vol. %, cashew dust of 5-15 vol. % and metal particles of 5-30 vol. %. It is mentioned that mica can replace asbestos as a main friction material.

Japanese Patent Publication No. 59-4459 teaches mixing coke powder and cashew dust as a friction material, whereby the coke powder becomes enveloped with cashew dust or the coke powder is diffused in the cashew dust.

The foregoing shows that a number of friction materials not using asbestos have been conventionally proposed. However, no known material has been developed that costs the same as an asbestos containing material and has the characteristics of asbestos such as flexibility, strength, wearing resistance and softness to provide a substitute for asbestos and consequently a plurality of different fibers are used together to provide a substitute for asbestos. However, most of the substitute fibers are thick and stiff and have such characteristics that separation and segregation between fibers and other powder material might occur dependent on the treatment after mixing mica and other powder materials. Separation and segregation prevent the formation of a homogeneous mixture.

In addition, since the powdery and scaly form of mica which can be used effectively as a substitute for asbestos, can explode, it is very difficult to form a homogeneous mixture. It is also difficult to mix mica and the like with resin or the like used as a binder or matrix, whereby the bonding between the mica and the binder may be insufficient, so that the friction material has a lower strength or cracks may be caused by expansions due to gas occurring during the formation and curing. Using an increased amount of resin as the binder for avoiding these problems, allows the heat resistance of the friction material to deteriorate, thereby furthering the expansion due to gas formation. Hence, it is difficult to manufacture a mica containing friction material of uniform quality as an effective substitute for a friction material containing asbestos.

Another conventional problem to be solved with respect to the characteristics required of a friction material for brakes, is brake noise occurring at the time of braking. It is difficult to effectively prevent such brake noise. Generally, a friction material containing a large amount of solid lubricant such as graphite is well-known as a friction material which is unlikely to cause brake noise. However, if a large quantity of graphite or the like is used, the friction coefficient $\mu$ is decreased resulting in a lower braking force. Also effective for preventing brake noise in braking, is a friction material containing a large quantity of organic filling materials such as rubber and cashew dust, as is disclosed in, for example, Japanese Patent Publication No. 59-4459 as mentioned above. However, such friction material also has a decreased friction coefficient $\mu$ when a brake is applied at a high speed. Such brake materials also generate more than normal heat, thereby increasing wear and tear.

U.S. Pat. No. 4,735,975 (Iwata et al.) discloses a brake pad material in which the granular structure is rigid as will be described in more detail below with reference to FIG. 12. Iwata et al. require this rigidness in the granular structure to avoid deformation or disturbance of the granular structure in the final thermal and pressure deformation applied for forming the brake pad material. Such a rigid granular structure cannot reduce brake noise because the particles within the granular structure are not easily displaced relative to each other when a brake force is applied.

SUMMARY OF THE INVENTION

It is an object of the present invention to provide a friction material which avoids using asbestos for environmental reasons and which solves the brake noise problem by substantially reducing brake noise compared to conventional brake material. The invention also wants to effectively prevent a reduction of the braking force due to a decrease of the friction coefficient. In other words, the invention aims at providing a brake friction material that maintains its friction coefficient during operation as a brake lining while still achieving a substantially reduced brake noise.

Another object of the present invention is to provide a method of manufacturing a friction material by which the environment is protected and a friction material of uniform quality can be manufactured.

Briefly stated, according to the invention, the present friction material includes friction particles, e.g., as granules that are approximately flat for adjusting the friction coefficient, and the wear resistance. Preferably, the friction particles which form the approximately flat granules are inorganic substances including graphite formed as layers having a plane network crystal structure for reducing brake noise. The expression "friction particles" is used herein interchangeably with the expression "inorganic substances including graphite. The inorganic particles are so arranged that the separation between the crystal layers of the inorganic particles occurs approximately in parallel to the friction surface of the friction material. It has been found that this effect substantially reduces the brake noise.

The friction material according to the invention comprises a granular component and a fibrous component, said granular component including a first binder and granules of inorganic particles held together by said first binder to form said granules, said inorganic particles having a plurality of layers formed as plane network crystal structure layers, and a second binder forming a matrix, said granular component and said fibrous component being embedded in said matrix of said second binder, and wherein said plane network crystal structure layers in said inorganic particles have an orientation in said granules substantially in parallel to said friction surface for reducing brake noise.

The present friction material is produced as follows: forming a granular material by mixing a first binder with inorganic particles having a plurality of layers formed as plane network crystal structure layers in said inorganic particles, by further mixing a second binder with said granular material and with a fibrous material to embed said granular material and said fibrous material in said second binder to form a deformable mixture, by molding said deformable mixture into a shape desired for said friction material, wherein said granules have an approximately flat configuration; and by grinding at least one surface of said shape to form said friction surface.

Forming the granular material for use in the friction material of the present invention is preferably performed as follows. The inorganic particles are mixed with a suitable first binder disclosed below. The resulting agglomeration is crushed to form the required granules prior to curing the agglomeration. It is important that the formed granules assume an approximately flat oblong configuration.

BRIEF DESCRIPTION OF THE DRAWINGS

In order that the invention may be clearly understood, it will now be described, by way of example, with reference to the accompanying drawings, wherein.

DESCRIPTION OF THE PREFERRED EMBODIMENTS AND OF THE BEST MODE OF THE INVENTION

Figure 1:
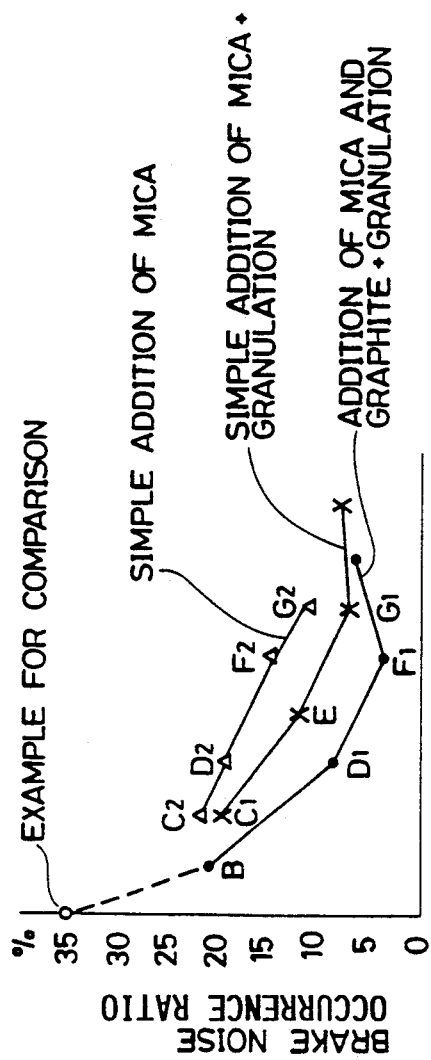
FIG. 1 is a graph showing brake noise occurrence ratios of A-I brake pads manufactured based on Table 2.

Table 1 shown in the following shows composition ratios of materials for disc brake pads according to one embodiment of the present invention. Table 2 shows 18 combinations (A, B, C1, C2, D1, D2, E, F1-7, G1, G2, H and I) of a particle diameter of graphite, a particle diameter of mica, a method of granulating graphite and mica, kinds and quantity of binder, kinds of solvent and the like.

TABLE 1

| Materials of Composition | Composition Ratios |
| --- | --- |
| kevlar (aramid pulp) | 10 vol. % |
| copper powder | 3 vol. % |
| glass fiber | 10 vol. % |
| cashew dust | 15 vol. % |
| molybdenum disulfide | 2 vol. % |
| phenol resin | 20 vol. % |
| graphite | Y vol. % |
| mica | X vol. % |
| calcium carbonate | residual quantity |
| subtotal | 100 vol. % |

(Note)
In using the formed granulated substance of graphite and mica, the amount of phenol resin equivalent to half the quantity of binder (vol) used in the granulated substance is decreased.

(Note) In using the formed granulated substance of graphite and mica, the amount of phenol resin equivalent to half the quantity of binder (vol) used in the granulated substance is decreased.

The remaining half of the binder for granulation is not included in the above described 100 vol. %.

TABLE 2

|  |  | A | B | C-1 | C-2 | D-1 | D-2 | E | F-1 |
|---|---|---|---|---|---|---|---|---|---|
| mica | 70μ |  |  |  |  |  |  |  |  |
|  | 100μ |  | 2.5 vol. % | 10 |  | 10 | 10 vol. % | 10 | 20 | 23 |
|  | 500μ |  |  |  |  |  |  |  |  |
| graphite | 270μ |  |  |  |  |  |  |  |  |
|  | 100μ |  | 4.5 vol. % |  |  | 5 vol. % | 5 |  | 7 |
|  | 60μ |  |  |  |  |  |  |  |  |
| method of granulation | rotary pan |  |  | 0 | 0 |  | 0 | 0 | 0 |
|  | extruding roll |  |  |  |  |  |  |  |  |
|  | none | 0 | 0 |  |  | 0 |  |  |  |
| kind of binder |  |  | phenol | ( polyethylene polyethylene glycol ) |  | ( NBR phenol ) | ( NBR phenol ) | ( NBR phenol ) |
| quantity of binder to mica graphite vol. % |  |  | 15 | 15 |  | 20 |  | 20 | 15 |
| solvent |  |  |  | trichloro-ethylene |  | H₂O |  | H₂O |  |

|  |  | F-7 | F-3 | F-4 | F-5 | G-1 | G-2 | H | I |
|---|---|---|---|---|---|---|---|---|---|
| mica | 70μ | 23 |  |  |  |  |  |  |  |
|  | 100μ |  | 23 | 23 |  | 30 | 30 | 10 | 40 |
|  | 500μ |  |  |  | 23 |  |  |  |  |
| graphite | 270μ |  |  |  | 7 |  |  |  |  |
|  | 100μ |  | 7 | 7 |  |  |  | 8 |  |
|  | 60μ | 7 |  |  |  |  |  |  |  |
| method of granulation | rotary pan |  |  |  |  | 0 | 0 | 0 | 0 |
|  | extruding roll |  | 0 |  |  |  |  |  |  |
|  | none |  | 0 |  |  |  | 0 |  |  |
| kind of binder |  |  | phenol | ( polyvinyl butyral ) |  | sodium alginate polyvinyl alcohol | NBR | vinyl acetate |
| quantity of binder to mica graphite vol. % |  |  | 15 vol. % | 12 | 12 |  |  | 15 | 40 |
| solvent |  |  | trichloro-ethylene |  |  | H₂O | H₂O | isopropyl alcohol |

(Note)
Phenol is resol type water soluble resin and NBR is latex.
(Note)
F-6 is cured by heating for 5 Hr at a temperature of 200° C. (F-6 has the same composition as that of F-3)
F-2 is the same as F-1, and is a simple addition without granulation.

An example A for comparison does not contain any mica nor any graphite at all and is not granulated. The conditions of formation of the disc brake pad shown in Table 1 were as follows. The temperature at which pressurization took place, was maintained at 160° C. The pressurization was applied for 10 minutes and the pressure was set so that the completed pad may have a porosity of 10%. After this thermal formation under pressure, the disc pad was heated in a furnace at 220° C. for 10 hours to complete the curing and thereafter the pad was abraded to have a prescribed thickness.

Figure 5:
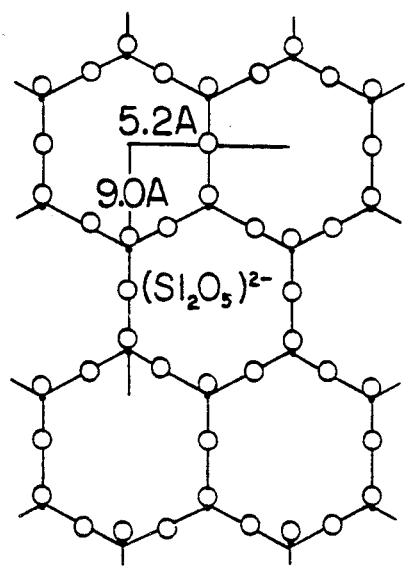
FIG. 5 shows a plane crystal structure network of the inorganic substances that are used in a friction material according to the invention.
Figure 6:
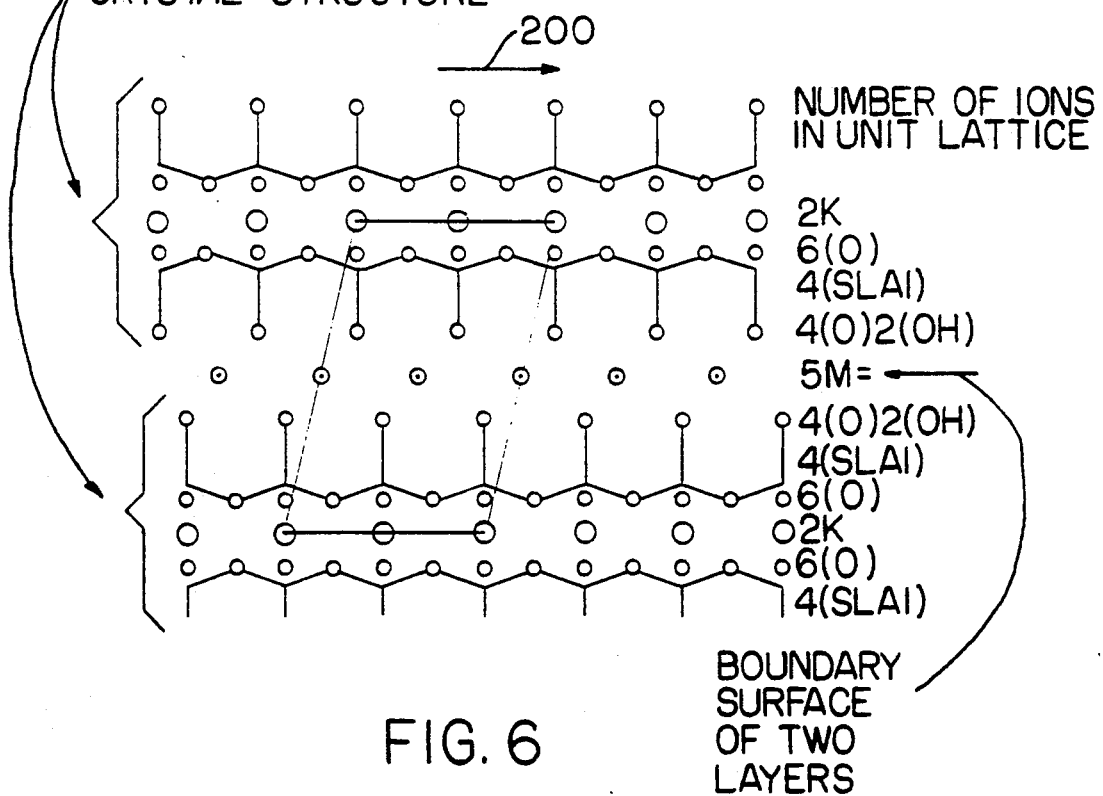
FIG. 6 is a side view showing two layers each having a plane crystal structure network of the inorganic substance of FIG. 5.

Referring to Table 2, the graphite used herein was natural graphite of scaly-form made in Sri Lanka and mica was phlogopite produced in Canada, both of which are suitable for the present purposes as substances having plane crystal structure network as shown in FIGS. 5 and 6. Inorganic substances having the plane crystal structure network are substances having a crystal structure in which radicals of $SiO_4$, e.g. polymeric acid radicals of $SiO_4$, and copolymeric acid radicals of $SiO_4$ and $AlO_4$ are present as main components. Silicic acid radicals having positive ions bound thereto are developed in a two-dimensional plane, netlike manner. A more detailed explanation thereof is given in Ceramics Handbook edited by Association of Ceramics, pp. 11–18. These substances have crystals developed in plane layers, and a slip phenomenon occurs in the layers because those layers are bound by a weak van der Waal's force. The invention reduces this slip phenomenon for controlling and improving the friction characteristics of the present friction material.

The inorganic substances having said plane, netlike crystal structure include talc, vermiculite, aluminum hydroxide, magnesium hydroxide, agalmatolite, kaolin, chlorite, sericite, iron hydroxide and montmorillonite etc. in addition to mica and graphite. Particle diameters of mica were 70 μm, 100 μm and 500 μm and those of graphite were 60 μm, 100 μm and 270 μm. The materials were granulated by a granulator having a rotary pan. A two shaft extruder having an extrusion slot with an inside diameter of 1 mm was used to form a strip which was kneaded and compressed between two separate rollers into a sheet of 0.5 mm thickness. In Table 2, F-3 and F-6 were granulated by the method using the two shaft extruder and F-4 was granulated by the compression method by using a roller, wherein F-6 was granulated after heating at 200° C. for 5 hours. The other samples were merely dried at a temperature below the boiling point of the solvent. The resulting granulated material having an average particle diameter of 300 μm, has been obtained by classification and grinding. Excepting F-6, the granulated materials contained in the abraded surfaces of the disc brake pads were extended by 10% or more and those of C-1, D, E, H and I were extended by 30% or more.

FIG. 1 is a graph showing the brake noise occurrence ratios of brake pads A-I manufactured in accordance with Table 2. The measurement of the brake noise occurrence ratios was carried out with the A-H brake pads attached to small-sized cars having a 2000 cc engine and running at a speed of 40 Km/h. The temperature of 40° C. of the pads before braking changed to 260° C. due to deceleration by applying the brakes and from 260° C. back to 60° C. in one test cycle. Each test cycle was divided into ten brake steps of 0.05 g in the range of 0.05 to 0.5 g. In total, the measurement of the brake noise occurrence ratios was carried out at 2200 stops in 10 test cycles.

Figure 2:
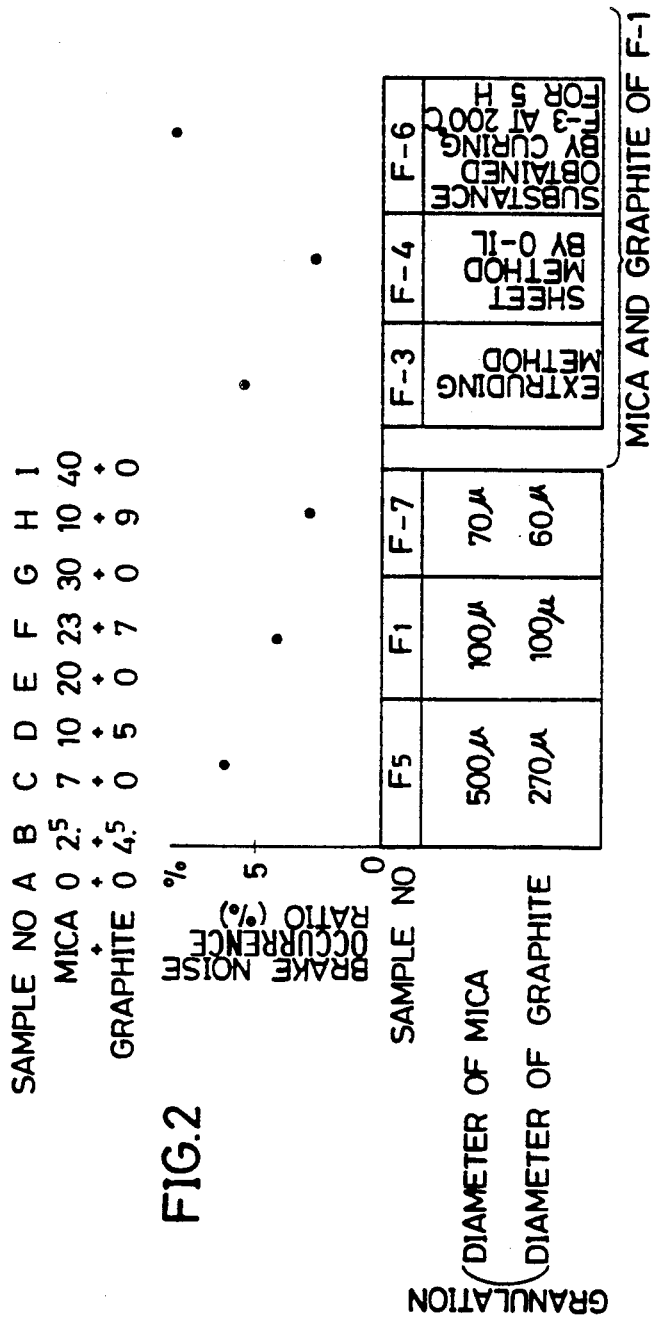
FIG. 2 is a graph showing, in addition to the brake noise occurrence ratio of F-1 showing in FIG. 1, brake noise occurrence ratios of F-3, F-4, F-5, F-6 and F-7 each singly equal in vol. % of mica and graphite measured under the same condition of measurement as that of F-1 in FIG. 1.

FIG. 2 is a graph showing, in addition to the brake noise occurrence ratio of F-1 shown in FIG. 1, the brake noise occurrence ratios measured under the same conditions as those in FIG. 1, on the samples F-3, F-4, F-5, F-6, and F-7. Each of these samples had the same volume percent of mica and graphite as the sample of F-1.

Figure 3:
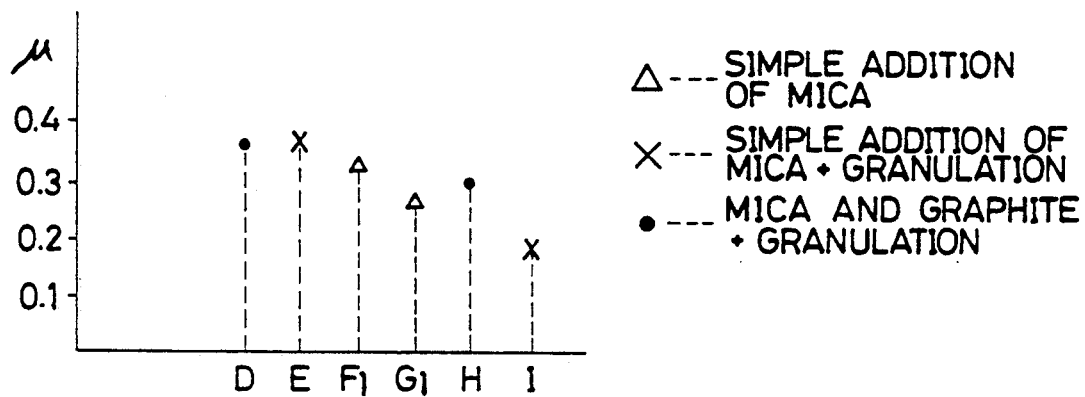
FIG. 3 is a graph showing friction coefficient I in a test conducted by using a dynamometer simulating a small sized car of 2000 cc in accordance with an examination standard of JASO 6914.

FIG. 3 shows the friction coefficients $\mu$ of the disc pads in the test carried out by using a dynamometer simulating a small-sized car having a 2000 cc engine in accordance with the examination standard of JASO 6914, wherein the second resistance was 130 Km/h and the deceleration was 0.6 g. The applied moment of inertia was 6.0 Kg·m·S$^2$ and brake discs having a thickness of 22 mm and an outer diameter of 250 mm were utilized.

Referring to FIGS. 1, 2 and 3, the test results will be described. First, it can be seen from FIGS. 1 and 3 that example B which includes a small quantity of mica, had a high brake noise occurrence ratio. Conversely, example I which includes a large quantity of mica had a lower brake noise occurrence ratio as compared to example B. It can be also seen that examples D and F each including both mica and graphite, had still lower brake noise occurrence ratios than that of example I. The friction coefficients $\mu$ of examples D and F were larger than that of example I. It can be seen from FIG. 2 that example F-6 made to include a thermally cured thermo-setting resin, had the highest brake noise occurrence ratio while example F-3 which was not thermally cured had a lower ratio. Furthermore, the brake noise occurrence ratio of example F-4 manufactured by the granulation method and compressing by using the rollers, had a lower brake noise occurrence ratio than that of example F-3. It can be also seen that example F-7 which includes mica and graphite having small particle diameters, had a brake noise occurrence ratio as low as that of example F-3.

The above described test results will now be considered in more detail.

Mica having a smaller particle diameter would more effectively prevent brake noise than mica having a larger particle diameter does when both samples include the same volume of mica. The brake noise could be more effectively prevented by blocks of mica having a smaller particle diameter, than the mica particles uniformly dispersed in the friction material. However, such mica blocks formed as a compound material of cured thermosetting resin as a binder for the mica compound blocks which are then conventionally ground, still have a relatively low brake noise prevention effect, which means that brake noise is still substantial. This is due to the fact that mica having a plate or scaly form is longitudinally, laterally and diagonally arranged at random in the friction material. Therefore, according to the invention mica needs to be arranged approximately in parallel to the friction surface of the friction pad in order to improve the brake noise preventing effect. The brake noise can be more effectively prevented by mica bodies having smaller particle diameters arranged in parallel to the friction surface. This is so because micro separation of the mica occurs due to frictional resistance resulting from the contact of the braking pad with the brake disc when a braking force is applied, whereby the stick slip phenomenon is suppressed.

In addition, particle diameters of the graphite and of the mica are preferably within the range of 150 $\mu$m to 300 $\mu$m or more.

At least a proportion of the flattened mica or mica and graphite in the friction surface should have a particle diameter of not less than 500 $\mu$m.

A first binder for helping the inorganic particles including mica or graphite to agglomerate as taught by the invention, is an adhesive agent such as molasses, sodium alginate, latex, polyvinyl alcohol cellulose, gelatin, pitch and lignin, thermoplastic resin and thermosetting resin which is not completely cured to form granules. Such binder may be used singly. However, it is preferable ferable to use the first binder together with an adhesive agent and resin in order to facilitate the granulation or rather agglomeration of mica and graphite particles, which do not mix together easily. Thermoplastic resin is preferred as a first binder for the agglomeration, whereby the mixture of granular material and a second binder forming a matrix is more fluid at the time of mixing. The first binder is not limited to an organic binder but it may be an inorgac binder such as sodium silicate and sodium polyphosphorate. The second binder that forms the matrix is a phenolic resin as disclosed in present Table 3.

The volume ratio of the first binder to the non-granulated inorganic substance is preferably 0.02:1 to 1.0:1, more preferably 0.04:1 to 0.5:1 and desirably 0.06:1 to 0.35:1 to obtain an effective agglomeration and the formation of granules. An insufficient binder results in an insufficient granulation or agglomeration, whereby dust is liable to be generated. On the other hand, a too large quantity of first binder in the friction material reduces or deteriorates the friction effect.

Granulation or agglomeration was carried out by using a Banbury mixer, a rubber roller for roller kneading, a pressure kneader and an extruder to obtain a block by either heat or pressure or both of them. Thereafter, the block was dried and ground as necessary. In order to make the fluidity larger during the formation, a grinder with a rotary pan is preferably by which granules having a small apparent density can be obtained without applying pressure. A spray dryer may be utilized dependent on the particle diameter of mica and graphite. In addition, the method of compressing the block into a thin sheet by a roll exceptionally allows mica and graphite to be arranged in parallel directions, which effectively prevents brake noise.

Inorganic substances having the plane netlike crystal structure as disclosed in FIGS. 5 and 6 and suitable for forming the granules with the help of the above mentioned first binder include, in addition to mica and graphite, talc, vermiculite, aluminum hydroxide, magnesium hydroxide, agalmatolite, kaolin, chlorite, sericite, iron hydroxide, montmorillonite, etc. As mentioned, mica, when comminuted into small particles, and graphite can produce the same effect.

The following Table 3 shows composition ratios of the materials for disc brake pads using inorganic substances having the plane netlike crystal structure, other than mica, according to the second embodiment of the present invention. Table 4 shows brake noise occurrence ratios of the disc brake pads made of materials shown in Table 3 in the brake noise test conducted under the same conditions of measurement as that shown in FIG. 1.

the pressure is set such that the completed pad may have a porosity of 10%. After the thermoformation, the pad is heated in a furnace at 220° C. for 10 hours to complete curing. Thereafter, as shown in step 103, the pad is abraded to have a prescribed thickness.

Referring to Tables 3 and 4, similar to mica, talc,

TABLE 3

| Materials of Compositon | a-1 | a-2 | a-3 | b-1 | b-2 | b-3 | c-1 | c-2 | c-3 |
|---|---|---|---|---|---|---|---|---|---|
| quebracho pulp | 10 | 10 | 10 | 10 | 10 | 10 | 10 | 10 | 10 |
| copper powder | 3 | 3 | 3 | 3 | 3 | 3 | 3 | 3 | 3 |
| glass fiber | 10 | 10 | 10 | 10 | 10 | 10 | 10 | 10 | 10 |
| cashew dust | 15 | 15 | 15 | 15 | 15 | 15 | 15 | 15 | 15 |
| molybdenumdisulfide | 2 | 2 | 2 | 2 | 2 | 2 | 2 | 2 | 2 |
| phenol resin | 19.25 | 19 | 17.75 | 19.25 | 19 | 17.75 | 19.25 | 19 | 17.75 |
| calcium carbonate | 33 | 25 | 10 | 33 | 25 | 10 | 33 | 25 | 10 |
| graphite | 4.5 | 5 | 7 | 4.5 | 5 | 7 | 4.5 | 5 | 7 |
| mica | | | | | | | | | |
| talc | 2.5 | 10 | 23 | | | | | | |
| aluminium hydroxide | | | | 2.5 | 10 | 23 | | | |
| vermiculite | | | | | | | 2.5 | 10 | 23 |
| magnesium hydroxide | | | | | | | | | |
| agalmatolite | | | | | | | | | |
| kaolin | | | | | | | | | |
| chlorite | | | | | | | | | |
| sericite | | | | | | | | | |
| iron hydroxide | | | | | | | | | |
| montmorillonite | | | | | | | | | |
| binder for granulation | 1.5 | 2 | 4.5 | 1.5 | 2 | 4.5 | 1.5 | 2 | 4.5 |
| total | 100.75 | 101 | 102.5 | 100.75 | 101 | 102.25 | 100.75 | 101 | 102.25 |

| Materials of Compositon | d-1 | d-2 | d-3 | d-4 | d-5 | d-6 | d-7 | e-1 | e-2 | e-3 |
|---|---|---|---|---|---|---|---|---|---|---|
| quebracho pulp | 10 | 10 | 10 | 10 | 10 | 10 | 10 | 10 | 10 | 10 |
| copper powder | 3 | 3 | 3 | 3 | 3 | 3 | 3 | 3 | 3 | 3 |
| glass fiber | 10 | 10 | 10 | 10 | 10 | 10 | 10 | 10 | 10 | 10 |
| cashew dust | 15 | 15 | 15 | 15 | 15 | 15 | 15 | 15 | 15 | 15 |
| molybdenumdisulfide | 2 | 2 | 2 | 2 | 2 | 2 | 2 | 2 | 2 | 2 |
| phenol resin | 19 | 19 | 19 | 19 | 19 | 19 | 19 | 18 | 18 | 18 |
| calcium carbonate | 23 | 25 | 25 | 25 | 25 | 25 | 25 | 12.5 | 2.5 | 7 |
| graphite | 7 | 5 | 5 | 5 | 5 | 5 | 5 | 4.5 | 4.5 | 5 |
| mica | | | | | | | | 13 | | |
| talc | | | | | | | | 10 | | |
| aluminium hydroxide | | | | | | | | | 13 | 13 |
| vermiculite | | | | | | | | | 10 | |
| magnesium hydroxide | 10 | | | | | | | | | |
| agalmatolite | | 10 | | | | | | | | |
| kaolin | | | 10 | | | | | | | |
| chlorite | | | | 10 | | | | | | 5 |
| sericite | | | | | 10 | | | | | |
| iron hydroxide | | | | | | 10 | | | | |
| montmorillonite | | | | | | | 10 | | 10 | 10 |
| binder for granulation | 2 | 2 | 2 | 2 | 2 | 2 | 2 | 4 | 4 | 4 |
| total | 101 | 101 | 101 | 101 | 101 | 101 | 101 | 102 | 102 | 102 |

TABLE 4

| Materials Composition | a-1 | a-2 | a-3 | b-1 | b-2 | b-3 | c-1 | c-2 | c-3 | d-1 | d-2 | d-3 | d-4 | d-5 | d-6 | d-7 | e-1 | e-2 | e-3 |
|---|---|---|---|---|---|---|---|---|---|---|---|---|---|---|---|---|---|---|---|
| brake noise occurance ratio % | 18 | 6 | 5 | 22 | 11 | 5 | 25 | 16 | 7 | 16 | 13 | 12 | 9 | 11 | 13 | 10 | 4 | 4 | 1 |

Figure 4:
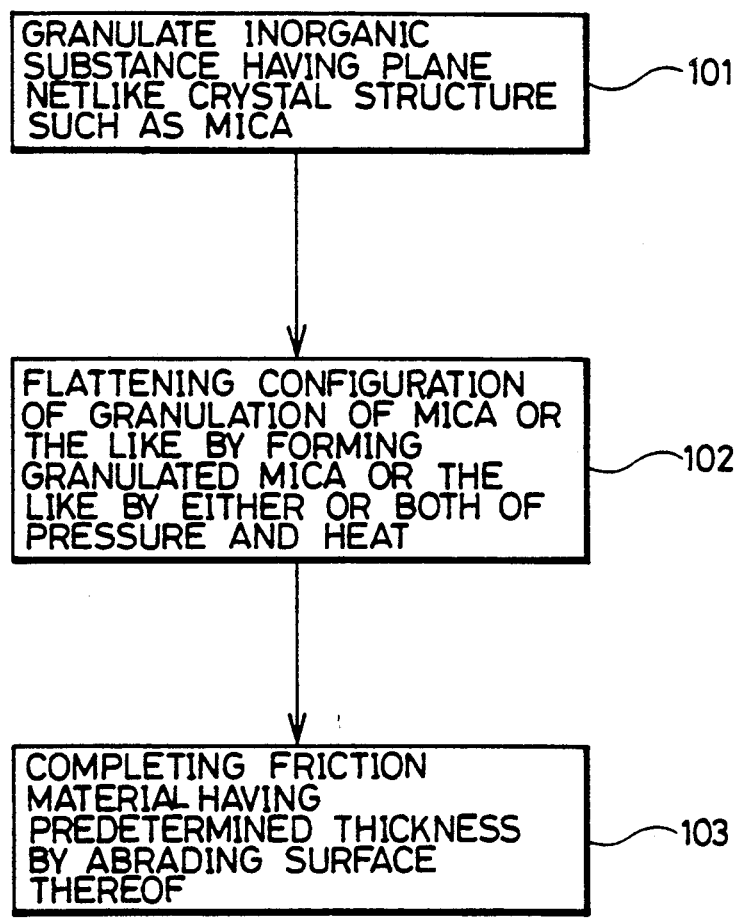
FIG. 4 is a process diagram explaining a method of manufacturing disc brake pads shown in Table 3.

FIG. 4 is a simplified block diagram for explaining the method of manufacturing the disc brake pads according to the invention made of material compositions shown in Table 3. With reference to FIG. 4, the method of manufacturing the disc brake pads shown in Table 3 will be described in general. A more detailed description will be provided below with reference to FIG. 13. First, as shown in step 101, granulation materials shown in Table 3 are granulated by the granulator with a rotary pan. Sodium alginate and polyvinyl alcohol are used as the first binder and water is used as a dilutent to form an agglomeration of particles in the form of granules. As shown in step 102, the conditions of forming the disc brake pads shown in Table 3 are the same as those shown in Table 1. The temperature for pressurization is 160° C., the time for pressurization is 10 mins. and aluminum hydroxide, vermiculite, magnesium hydroxide, agalmatolite, kaolin, chlorite, sericite, iron hydroxide and montmorillonite effectively lower the brake noise occurrence ratio of a brake pad according to the invention. The quantity of the just listed materials is preferably not larger than half of the total quantity of the substance having the plane crystal structure network and preferably not more than 1/5. The quantity of graphite should not be larger than maximally 2.0 vol. % with respect to the total volume of the substance of the plane netlike crystal structure, preferably not larger than 1.5 vol. %, preferably not larger than 1.0 vol. %. While the increased quantity of graphite more effectively prevents brake noise, it decreases the friction coefficient μ.

In the present embodiment, one or more than one of mica, vermiculite, graphite, talc, magnesium hydroxide, agalmatolite, kaolin, chlorite, sericite, iron hydroxide and montmorillonite may be used in combination with an organic or inorganic first binder to form granules which are used as a part of the present friction material. The first binder for granulation or agglomeration can be softened and fluidized by heat or both heat and pressure in forming a friction material and the configuration of thus formed granulated material or rather of the particle orientation in the granules is substantially flat which is different from the original orientation. The flat orientation of the plane netlike crystal structure particles such as mica, makes sure that the particles in the surface of the friction material are arranged substantially in parallel to the friction surface, namely along the direction of the friction and consequently, microseparation is liable to occur to effectively reduce the brake noise of the brake. As a result of research on materials for effectively reducing the brake noise, it was found that inorganic particles of the plane netlike crystal including mica, vermiculite, aluminum hydroxide and magnesium hydroxide are effective and an even better reduction of the brake noise can be obtained by using the same together with graphite. It is appropriate that the quantity of granulated granules contained in the brake material is in the range of 1–35 vol. % of the total quantity, preferably in the range of 3–30 vol. % and preferably in the range of 5–25 vol. %.

In this case, if the quantity of granulated granules is small, the brake noise can not be effectively prevented and conversely, if the quantity is too large, the friction coefficient μ at a high speed is decreased. Granulated mica, graphite and the like may be used together with this granulated substance of granules. While the inorganic substances having the plane netlike crystal structure are used in the present embodiment, the present invention is not limited thereto and a substance having a similar crystal structure to the plane netlike crystal structure may be used.

Figure 7:
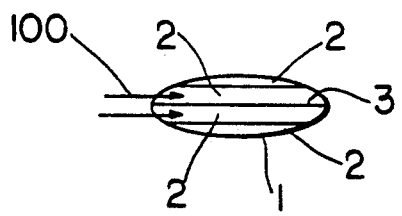
FIG. 7 is an enlarged view of a single friction particle formed of a number of layers of an inorganic substance, whereby each of these layers has a plane crystal structure network as shown in FIGS. 5 and 6.

FIG. 7 shows a particle 1 of an inorganic substance as disclosed above. The particle 1 has, for example, four layers 2 interconnected along boundary surfaces 3. Each layer of the inorganic substance has a plane network of a crystal structure as described above with reference to FIGS. 5 and 6. When the layers 2 are displaced relative to each other, in response to friction forces indicated by arrows 100, the above mentioned "slip phenomenon" occurs along the boundary surfaces 3. Each particle 1 has a somewhat oblong, relatively flat configuration.

Figure 8:
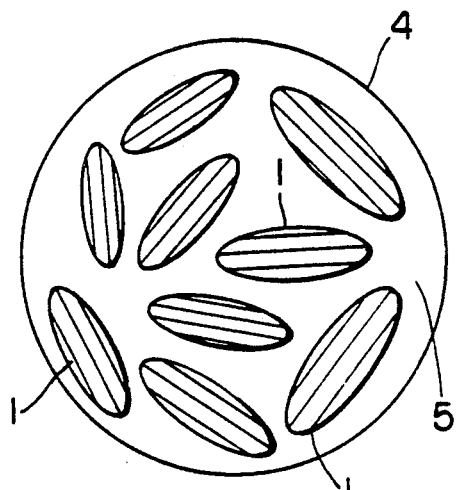
FIG. 8 is an enlarged view of a friction granule formed of a plurality of friction particles as shown in FIG. 7 embedded in a first binder material.

FIG. 8 shows one granule 4 formed by mixing the particles 1 of FIG. 7 with a first binder 5 in which the particles 1 are enveloped or embedded. For example, nine particles 1 may form 1 granule 4. The number of particles 1 in the granules 4 is random. The granules 4 are formed as described above.

Figure 9:
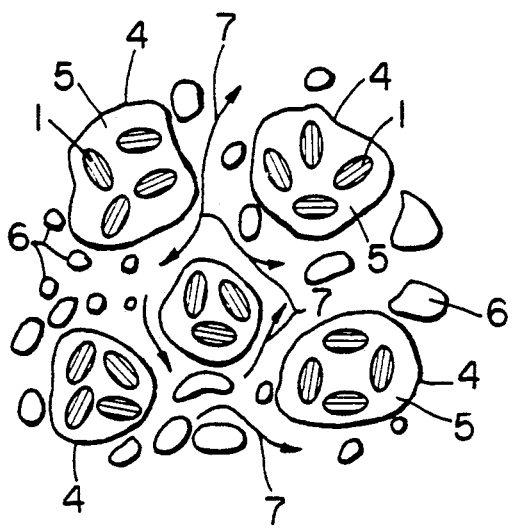
FIG. 9 is a mixture of friction granules as shown in FIG. 8 with a reinforcing fibrous material in a second binder to form the friction material of the invention.
Figure 10:
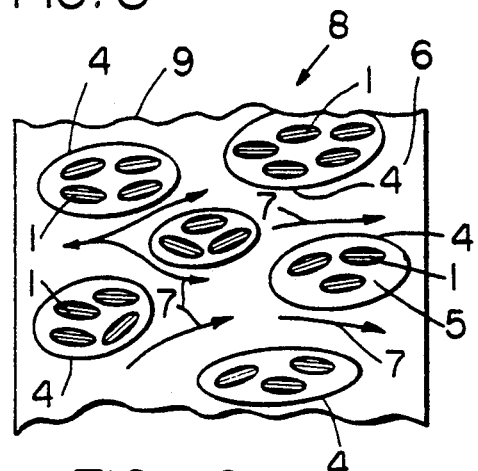
FIG. 10 shows the friction material of FIG. 9 following a treatment causing an orientation of the friction particles inside the friction granules substantially in parallel to a surface that will become a friction surface in the finished friction body of the invention.
Figure 11:
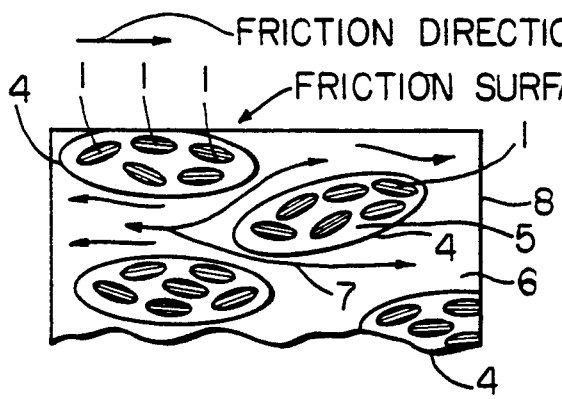
FIG. 11 is a view similar to that of FIG. 10, but showing the plane friction surface of a friction body according to the invention in which the friction particles in the friction granules are oriented substantially in parallel to said plane friction surface.

FIG. 9 shows the result of the mixing of a second binder 6 with the granules 4 shown in FIG. 8 and with fibrous material 7 forming a reinforcement or filler. The deformable mixture of FIG. 9 is then molded by the application of pressure and/or heat to form a molded body 8 shown in FIG. 10. The granules 4 and the fibrous material 7 are embedded in the second binder material 6 to form the molded body 8 in such a way that all of the granules 4 with their oblong, approximately flat configuration are oriented in a predetermined direction which is the direction of the friction force 100 shown in FIG. 7. The second binder is, for example, phenolic resin as shown in Table 3. The molded body 8 has a rough surface 9 which will be the surface that is to be subjected to a grinding operation to form the friction surface or ground surface 10 shown in FIG. 11. The friction force 100 will be applied in parallel to the friction surface 10 so that the orientation of the oblong flat particles 1 and the orientation of the oblong approximately flat granules 4 will extend substantially in parallel to the friction surface 10 as shown in FIG. 11.

Figure 12:
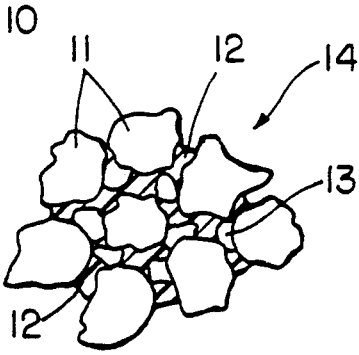
FIG. 12 is an enlarged sectional view of a conventional friction material according to U.S. Pat. No. 4,735,975 (Iwata et al.) to be compared with the present friction material as shown in FIG. 11.

FIG. 12 corresponds to the illustration of FIG. 1 of U.S. Pat. No. 4,735,975 (Iwata et al.). Random shaped granules 11 are held together by a resin binder 12 which leaves either open or closed interstices 13 between neighboring random shaped granules 11. Such a structure 14 does not suggest any reduction of the brake noise because neither the particles which form the random shaped granules 11 nor the granules themselves, suggest the orientation claimed according to the invention.

Figure 13:
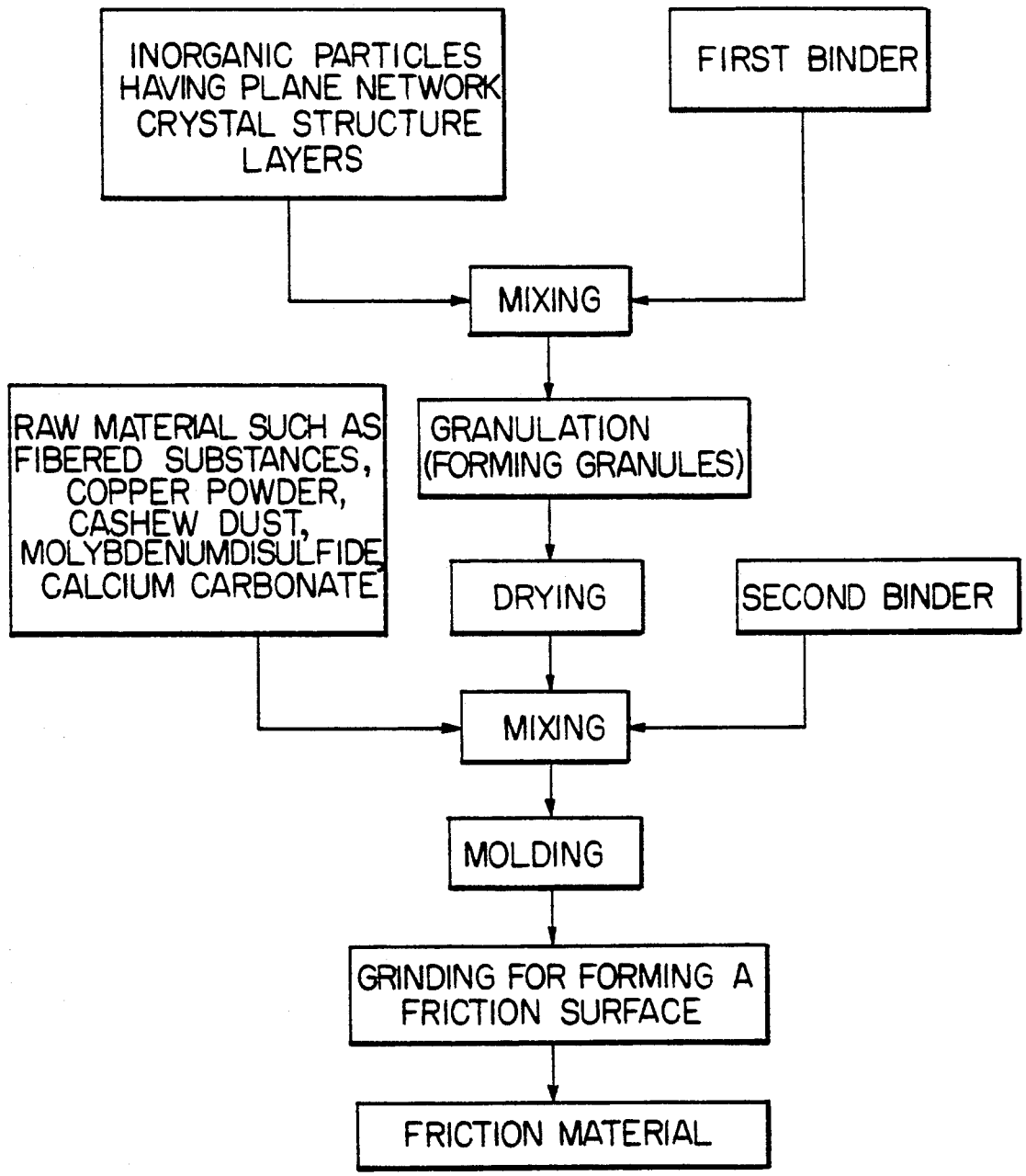
FIG. 13 is a block diagram illustrating the steps for making a friction material body according to the invention.

FIG. 13 summarizes the substances of the foregoing description and the labels in FIG. 13 are self-explanatory. The fibrous material that is used with the second binder and the granular material is listed, for example, as copper powder, cashew dust, molybdenum disulfide, calcium carbonate, and the like.

In the method of manufacturing the present disc brake pads the plane netlike crystal structure of the particles in the granules formed by the first binder, which is used without being cured, results in a predominantly flat orientation of the mica or the like particles in the granules, whereby a micro-separation, caused by the application of a brake force, occurs in the friction surface of the disc brake pad. This micro-separation is facilitated by the flat particle orientation, whereby brake noise has been reduced. In addition, a granule of, e.g. mica formed by granulation results in a heavy substance, so that a manufacturing problem such as the blowing-up of mica dust has been effectively prevented. Furthermore, since the number of particles is reduced by granulation or agglomeration, it is possible to effectively prevent separation, segregation and decrease of the strength of the friction material due to insufficient mixture of a binder and mica or the like, which is the problem in using conventional fibers as a main material for the brake pads.

The friction material according to the present invention avoids the problem of maintaining a hygienic environment while simultaneously effectively preventing brake noise while still maintaining the size of the braking force. In other words, the invention avoids a decrease of the friction coefficient.

Although the invention has been described with reference to specific example embodiments, it will be appreciated that it is intended to cover all modifications and equivalents within the scope of the appended claims.

What we claim is:

1. A friction material having a friction surface, comprising a granular component and a fibrous component, said granular component including granules comprising a first binder and friction particles held together by said first binder to form said granules of said granules component, said friction particles having a plurality of layers formed as plane network crystal structure layers interconnected along boundary surfaces in said friction particles, said friction material further comprising a second binder forming a matrix, said granular component and said fibrous component being embedded in said matrix of said second binder, and wherein said plane network crystal structure layers in said friction particles have an orientation in said granules substantially in parallel to said friction surface for reducing brake noise.

2. The friction material of claim 1, wherein said granules of said granular component have a deformed oblong configuration so that said oblong configuration granules also extend approximately in parallel to said friction surface.

3. The friction material of claim 1, wherein said friction particles have an oblong configuration.

4. The friction material of claim 1, wherein said friction particles held together by said first binder in said granules include at least one member selected from the group consisting of mica, talc, vermiculite, aluminum hydroxide, magnesium hydroxide, agalmatolite, kaolin, chlorite, sericite, iron hydroxide, montmorillonite and graphite.

5. A method for producing a friction material having a friction surface, comprising the following steps:
   (a) forming a granular material by mixing a first binder with friction inorganic particles having a plurality of layers formed as plane network crystal structure layers in said friction particles,
   (b) mixing a second binder with said granular material and with a fibrous material to embed said granular material and said fibrous material in said second binder to form a deformable mixture,
   (c) molding said deformable mixture into a shape desired for said friction material, wherein granules of said granular material have an approximately flat configuration, oriented parallel to said friction surface and
   (d) grinding at least one surface of said shape to form said friction surface.

6. The method of claim 5, wherein said molding step is performed with the simultaneous application of heat and molding pressure to said deformable mixture.

7. The method of claim 5, wherein said molding step is performed by the application of heat to said deformable mixture.

8. The method of claim 5, wherein said molding step is performed by the application of molding pressure to said deformable mixture.

9. The method of claim 5, further comprising curing of said desired shape prior to said grinding.

10. The method of claim 5, wherein said granular material is formed by agglomeration of said friction particles with the aid of said first binder.

11. The method of claim 5, wherein said step of forming said granular material comprises mixing said friction particles with said first binder to form a mixture of crushable material, and crushing said crushable material to form said granular material.

12. The method of claim 11, further comprising drying said mixture prior to crushing.

13. The method of claim 5, wherein said grinding is performed so that said approximately flat configuration of said granules extends substantially in parallel to said friction surface in said friction material.

14. The method of claim 5, wherein said molding is performed so that said plane network crystal structure layers of said inorganic particles extend substantially in parallel to said friction surface.

* * * * *

UNITED STATES PATENT AND TRADEMARK OFFICE
CERTIFICATE OF CORRECTION

PATENT NO. : 5,268,398

DATED : Dec. 7, 1993

INVENTOR(S) : Nakagawa et al.

It is certified that error appears in the above-identified patent and that said Letters Patent is hereby corrected as shown below:

On the title page: item [56],
under "References Cited" please add:
 --US Patent 4,273,699 Chester  6/1981
   US Patent 4,310,452 Chester  1/1982--;

Column 1, line 11, replace "07/575,671" by --07/576,671--;

Column 9:
Table 3, in the heading line, replace "Compositon" by --Composition--;

Column 9:
Table 4, under "e-3" change "1" to --7--;

Column 12, line 65, replace "granules" (2nd occurrence) by --granular--;

Column 13, line 26, delete "inorganic";

Column 14, line 2, after "surface" insert --,--.

Signed and Sealed this

Eleventh Day of October, 1994

Attest:

BRUCE LEHMAN

Attesting Officer

Commissioner of Patents and Trademarks